United States Patent
Tayal et al.

(10) Patent No.: US 11,411,884 B2
(45) Date of Patent: Aug. 9, 2022

(54) MULTIPLE NETWORK CONTROLLER SYSTEM, METHOD, AND COMPUTER PROGRAM FOR PROVIDING ENHANCED NETWORK SERVICE

(71) Applicant: Amdocs Development Limited, Limassol (CY)

(72) Inventors: Sagar Tayal, Ambala (IN); Ramkumar Sharma, Rajasthan (IN); Mitul Surti, Pune (IN)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 16/683,033

(22) Filed: Nov. 13, 2019

(65) Prior Publication Data

US 2021/0144102 A1 May 13, 2021

(51) Int. Cl.
*H04L 47/78* (2022.01)
*H04L 43/0876* (2022.01)
*H04L 41/147* (2022.01)
*G06N 20/00* (2019.01)

(52) U.S. Cl.
CPC .......... *H04L 47/781* (2013.01); *H04L 41/147* (2013.01); *H04L 43/0876* (2013.01); *H04L 47/788* (2013.01); *G06N 20/00* (2019.01)

(58) Field of Classification Search
CPC ..... H04L 67/32; H04L 67/322; H04L 47/781; H04L 47/788; H04L 41/508; H04L 43/0876; H04L 41/5096; H04L 41/5058; H04L 41/5054; H04L 41/147; G06K 9/6256; G06N 20/00; G05N 20/00
See application file for complete search history.

(56) References Cited

U.S. PATENT DOCUMENTS

| | | | | |
|---|---|---|---|---|
| 7,711,372 B2 * | 5/2010 | Iyer | .................... | H04W 36/16 455/447 |
| 9,210,534 B1 * | 12/2015 | Matthieu | ................ | H04L 67/16 |
| 9,749,243 B2 * | 8/2017 | Gonzalez | ............. | H04L 67/306 |
| 9,838,268 B1 | 12/2017 | Mattson | | |
| 9,906,422 B2 * | 2/2018 | Jalan | ................... | H04L 43/0817 |
| 10,187,252 B2 * | 1/2019 | Byers | ................. | H04L 41/0853 |
| 10,205,677 B2 * | 2/2019 | Udupi | .................... | H04L 47/78 |
| 10,225,774 B2 * | 3/2019 | Diwane | ................ | H04W 36/30 |
| 10,230,592 B2 * | 3/2019 | Scholz | ............... | H04L 41/5032 |
| 10,230,661 B2 * | 3/2019 | Zhang | ................... | H04L 41/12 |

(Continued)

OTHER PUBLICATIONS

International Search Report and Written Opinion from PCT Application No. PCT/IB2020/060561, dated Feb. 9, 2021.

*Primary Examiner* — Patrice L Winder
(74) *Attorney, Agent, or Firm* — Zilka-Kotab, P.C.

(57) ABSTRACT

As described herein, a multiple network controller system, method, and computer program are disclosed for providing enhanced network service. The multiple network controller system includes multiple network controllers each associated with a different network. In use, the system receives a request for a network service. Additionally, the system processes the request to select one or more of the network controllers to use for providing the network service, where the selection is made based on at least a quality requirement specified for the network service. Further, the system causes the selected one or more of the network controllers to provide the network service.

18 Claims, 6 Drawing Sheets

(56) References Cited

U.S. PATENT DOCUMENTS

| | | | |
|---|---|---|---|
| 10,348,570 B1* | 7/2019 | Hegrat | H04L 41/0803 |
| 10,511,542 B2* | 12/2019 | Srinivasan | H04L 47/808 |
| 10,530,632 B1* | 1/2020 | Mukhopadhyaya | H04L 41/5041 |
| 10,601,664 B2* | 3/2020 | Kumar | H04L 41/0853 |
| 10,816,944 B2* | 10/2020 | Britt | H04W 4/80 |
| 10,855,684 B2* | 12/2020 | Nadeau | G06F 21/604 |
| 2014/0148152 A1 | 5/2014 | Periyalwar et al. | |
| 2015/0119103 A1 | 4/2015 | Ngai et al. | |
| 2015/0348065 A1 | 12/2015 | Doganata et al. | |
| 2016/0345377 A1 | 11/2016 | Lindoff et al. | |
| 2016/0374108 A1 | 12/2016 | Lee et al. | |
| 2018/0176143 A1* | 6/2018 | Cui | H04L 49/70 |
| 2019/0306267 A1* | 10/2019 | Lee | H04L 41/0273 |
| 2020/0186411 A1* | 6/2020 | Ravichandran | H04L 41/0668 |
| 2020/0196209 A1* | 6/2020 | Cui | H04B 7/1851 |
| 2021/0288888 A1* | 9/2021 | Daidone | H04L 41/5032 |

\* cited by examiner

MULTIPLE NETWORK CONTROLLER SYSTEM, METHOD, AND COMPUTER PROGRAM FOR PROVIDING ENHANCED NETWORK SERVICE

FIELD OF THE INVENTION

The present invention relates to network controllers providing network connectivity to computer devices.

BACKGROUND

To enable a computer device, such as mobile device, to connect to a network, the computer device is typically configured to include a network controller. The network controller is hardware and/or software of the computer device that controls or otherwise enables the computer device to connect to a particular network. The network controller may be adapted to perform tuning based on predefined parameters, but only at a network-level, or in other words only with respect to the particular network to which the network controller is configured to connect.

There is thus a need for addressing these and/or other issues associated with the prior art.

SUMMARY

As described herein, a multiple network controller system, method, and computer program are disclosed for providing enhanced network service. The multiple network controller system includes multiple network controllers each associated with a different network. In use, the system receives a request for a network service. Additionally, the system processes the request to select one or more of the network controllers to use for providing the network service, where the selection is made based on at least a quality requirement specified for the network service. Further, the system causes the selected one or more of the network controllers to provide the network service.

DETAILED DESCRIPTION

Figure 1:
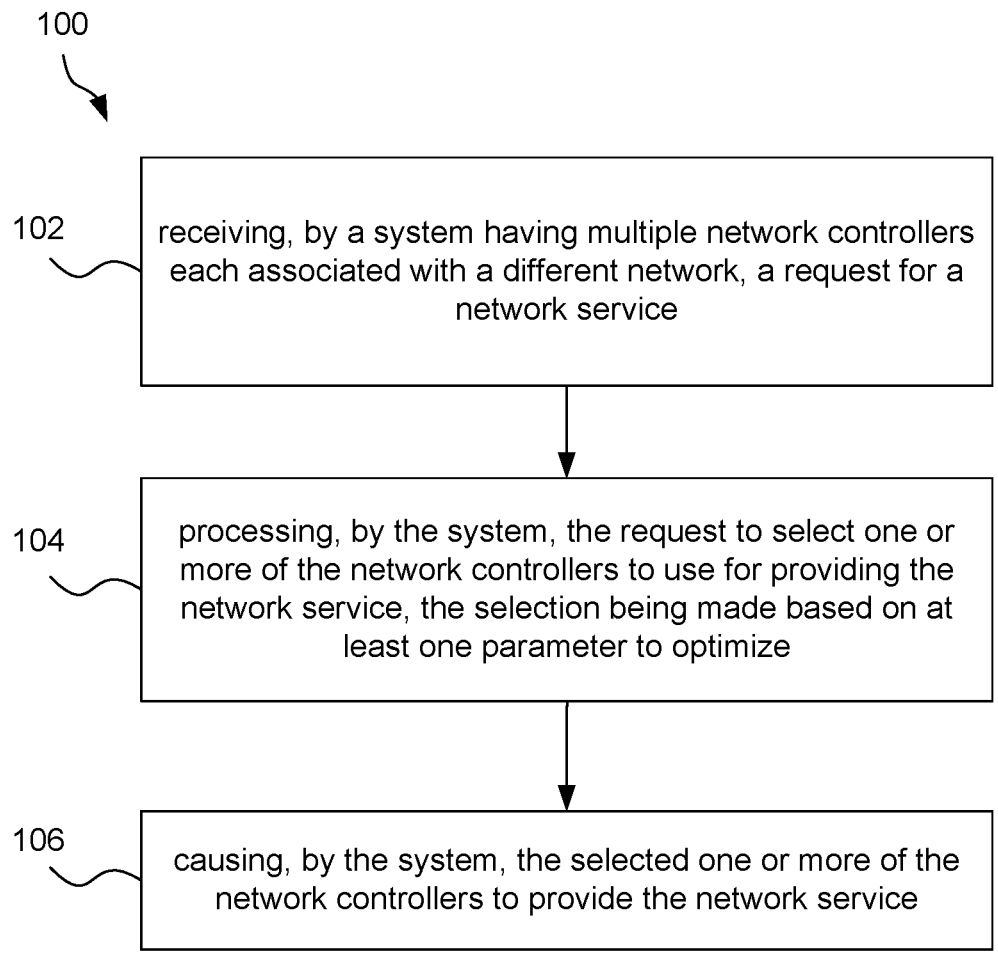
FIG. 1 illustrates a method of a multiple network controller system that provides enhanced network service, in accordance with one embodiment.

FIG. 1 illustrates a method 100 of a multiple network controller system that provides enhanced network service, in accordance with one embodiment. In the context of the present description, the multiple network controller system is a system that includes multiple network controllers. The system may be a single computer system, such as any of those described below with reference to FIGS. 5 and/or 6.

The network controllers are comprised of hardware and/or software and are each associated with a different network. In particular, each network controller is configured to provide a connection to, and thus corresponds with, a particular network, by implementing the electronic circuitry required to communicate using a specific physical layer and data link layer standard for the particular network. Accordingly, each network controller may use with the protocol, requirements, etc. of the particular network to which the network controller corresponds. The different networks associated with the network controllers may be WiFi networks, cellular networks, radio access technology (RAT), etc. Additionally, it should be noted that the multiple of the networks associated with the network controllers may be of a same type (e.g. all WiFi networks), but may be provided by different service providers.

In use, the system receives a request for a network service, as shown in operation 102. The network service may be any application or functionality provided in the network, such as storage, data processing, data access, communication, etc. In one embodiment, the request may be initiated at the system. In another embodiment, such that described in more detail below with respect to FIG. 4, the request may be initiated at a slave device to the system (acting as a master device). Thus, the request may originate at a requesting device that may or may not be the system.

In a further embodiment, the request may be for a new network service, or in other words to establish (e.g. access) the network service for the requesting device. In this embodiment, the request may be initiated on-demand (e.g. by a user of the requesting device). However, in another optional embodiment, the request may be for an existing network service, or in other words a network service already established for the requesting device. For example, the request may be initiated (e.g. automatically) for the purpose of improving an aspect of the existing network service, such as a quality, etc.

Additionally, as shown in operation 104, the system processes the request to select one or more of the network controllers to use for providing the network service, where the selection is made based on at least one parameter to optimize.

In one embodiment, the parameter may be quality. In particular, the system may select the network controller(s) capable of optimizing (e.g. maximizing) a quality associated with provisioning the network service, or capable of meeting a specified quality required for the network service. The quality may refer to a quality of service (QoS), such as a throughput, latency, etc. for the network service.

In another embodiment, the parameter may be cost. For example, the system may select the network controller(s) capable of optimizing (e.g. minimizing) a cost (e.g. monetary cost per subscription) associated with provisioning the network service. Any parameter to be optimized for the network service, such as those mentioned above, may be specified in the request for the network service or in a policy associated with the requesting device that is accessible to the system.

Still yet, any predefined algorithm may be utilized for processing the request to determine the one or more of the network controllers to use for providing the network service. In one embodiment, the algorithm may be a machine learning algorithm. The machine learning algorithm may initially be trained using training data gathered from the system or any remote system. The training data may include historical behavior of the multiple network controllers and the different networks. Once trained, the machine learning algorithm may infer, based on the network service requested and the parameter(s) to optimize, the one or more of the network controllers to use for providing the network service. For example, the machine learning algorithm may be capable of forecasting a status (e.g. health) of each of the networks and selecting one or more of the network controllers based thereon.

Further, as shown in operation 106, the system causes the selected network controller(s) to provide the network service. In one embodiment, the system may instruct the selected network controller(s) to provide the network service. For example, the system may cause a single selected network controller to provide the network service to the requesting device. As another example, the system may cause multiple selected network controllers to provide different portions of the network service to the requesting device.

To this end, the method 100 may optimally select among the multiple network controllers for use in providing the network service to the requesting device. This selection may be performed dynamically, or in other words at the time of the request, to ensure that the selection is optimal for the current conditions of the networks and/or the request device.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
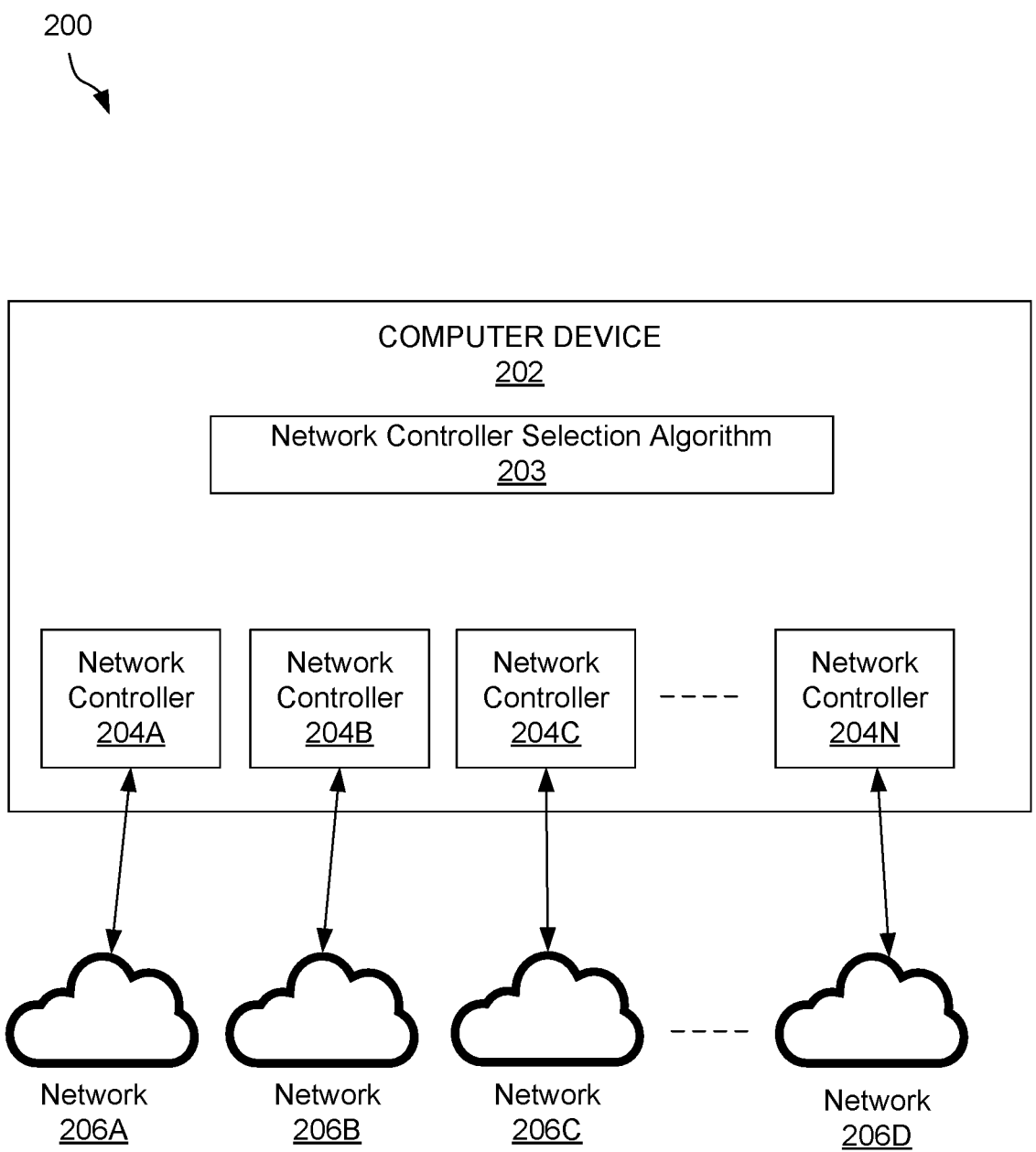
FIG. 2 illustrates a multiple network controller system that provides enhanced network service, in accordance with one embodiment.

FIG. 2 illustrates a multiple network controller system 200 that provides enhanced network service, in accordance with one embodiment. As an option, the system 200 may be implemented to carry out the method 100 of FIG. 1. Of course, however, the system 200 may be implemented in the context of any desired environment. Further, the aforementioned definitions may equally apply to the description below.

As shown, a computer device 202 includes multiple network controllers 204A-N. Each network controller of the multiple network controllers 204A-N is configured to connect the computer device 202 to a respective network 206A-N. The computer device 202 may include any number of network controllers 204A-N to enable the computer device 202 to connect to any number of different networks 206A-N.

The computer device 202 also includes a network controller selection algorithm 203. The computer device 202 executes the network controller selection algorithm 203 to select which of the network controllers 204A-N to use for provisioning a particular requested network service. The network controller selection algorithm 203 may be a machine learning algorithm, in one embodiment.

In one embodiment, the computer device 202 may provide single transmission support. In other words, the computer device 202 may be enabled to allow only one of the network controllers 204A-N to be utilized (e.g. to operate) at a given point in time.

In another embodiment, the computer device 202 may provide multiple transmission support. In this embodiment, the computer device 202 may be enabled to allow multiple of the network controllers 204A-N to be utilized in parallel (e.g. for co-functioning to provide a single network service or for providing multiple different network services). For example, the multiple transmission support may enable a network controller selected by the network controller selection algorithm 203 to provide the requested network service while at least one other one of the network controllers 204A-N (e.g. also selected by the network controller selection algorithm 203) is providing another network service.

Figure 3:
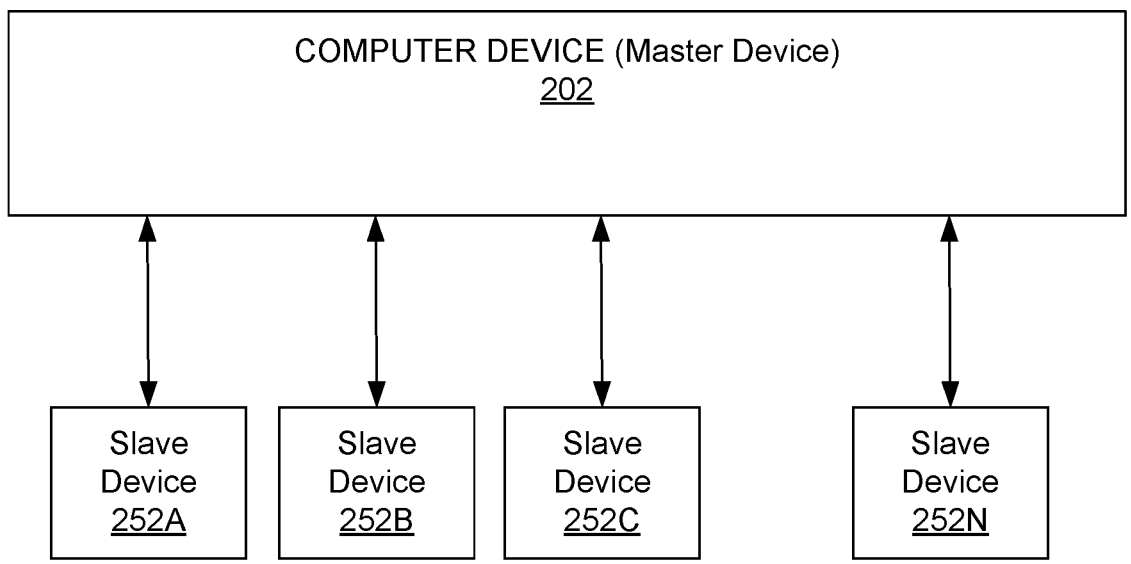
FIG. 3 illustrates an implementation of the multiple network controller system of FIG. 2 as a master device with multiple slave devices, in accordance with one embodiment.

FIG. 3 illustrates an implementation 250 of the multiple network controller system 200 of FIG. 2 as a master device with multiple slave devices, in accordance with one embodiment. Of course, it should be noted that present embodiment is just one possible implementation 250 of the multiple network controller system 200 of FIG. 2, and thus the multiple network controller system 200 of FIG. 2 is not necessarily limited by the embodiment shown and described herein with respect to FIG. 3.

In the present embodiment, the computer device 202 is a master device having the multiple network controllers shown in FIG. 2. The computer device 202, as the master device, also has (e.g. is in communication with) multiple slave devices 252A-N. One or more of the slave devices 252A-N may not necessarily have their own network controllers, in which case they may be wired to the master device. Additionally, one or more of the slave devices 252A-N may have a single network controller that connects such slave devices to the master device via a particular network. Just by way of example, one or more of the multiple slave devices 252A-N may be internet of things (IoT) devices.

In the present implementation 250, each of the slave devices 252A-N may send requests for network services to the master device 202. In accordance with the method 100 of FIG. 1, the master device 202 may process each of the requests to select one or more of its network controllers to use to provide the requested network service to the requesting slave device 252A-N. The master device 202 may then cause the selected network controller(s) to provide the requested network service to the requesting slave device 252A-N. Thus, each network service may be provided to the slave device 252A-N through the master device 202.

In one exemplary use-case scenario, slave devices 252A-N would be connected via a master device 202 network controller that could best cater the required network service. For example, in a dynamic multiple smart IOT device connectivity scenario under the master/slave ecosystem, a smart car slave device 252A-N could be connected to a low latency network controller while downloading in another connected slave device 252A-N could happen via another network controller as per the network health at that instance to cater the best QoS. This assists in fulfilling the ULTRA low latency requirement for the smart car while selecting a network controller which will have the highest available resources to meet a peak throughput requirement.

Figure 4:
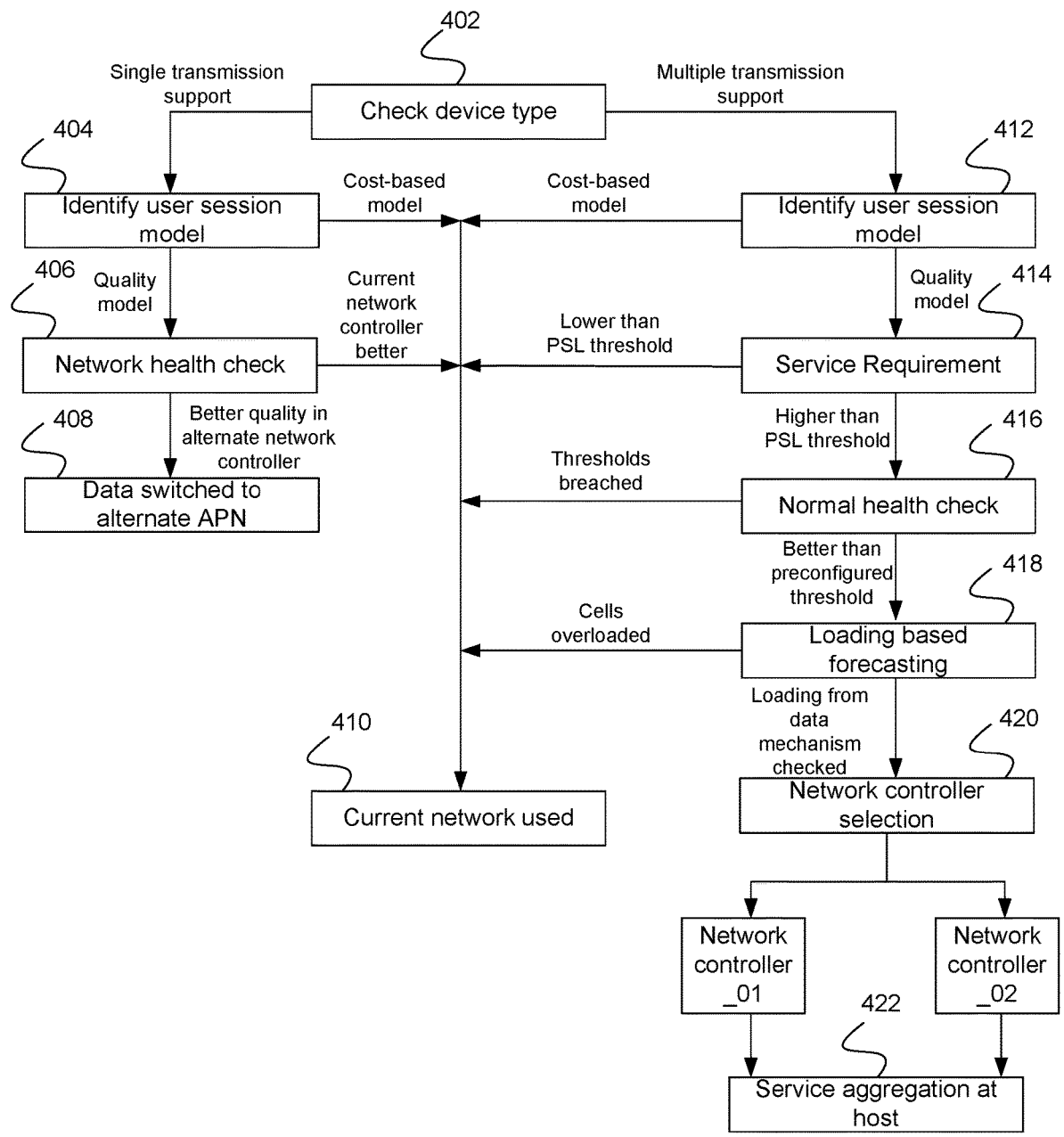
FIG. 4 illustrates a flowchart of one possible method of the multiple network controller system of FIG. 2, in accordance with one embodiment.

FIG. 4 illustrates a flowchart of one possible method 400 of the multiple network controller system 200 of FIG. 2, in accordance with one embodiment. Of course, it should be noted that the multiple network controller system 200 of FIG. 2 may not be limited to the method 400 described herein. In one embodiment, the method 200 may be performed by the network controller selection algorithm 203 of the multiple network controller system 200 of FIG. 2.

As shown in operation 402, a type of device to be provided with a network service is determined. The type of device refers to whether the device is configured with single transmission support (a single transmission capability) or multiple transmission support (a multiple transmission capability). When the type of device is determined to be one that provides single transmission support, a user session model is identified, as shown in operation 404. The user session model refers to the policy according to which network selection is to be made. For example, the user session model specifies the one or more parameters that are to be optimized when making a network selection. The policy may be user-specific (i.e. configured for a current user of the device).

When the user session model is a cost-based model, then the network that is selected for providing the network service is one that optimizes (e.g. minimizes) cost for the user. This may be determined based on the various subscriptions to network services held by the user. In the example shown, a currently connected network is used in operation 410.

When the user session model is a quality-based model, then a health of each network is checked as shown in operation 406. If the currently connected network has the best health for providing the best quality, then the currently connected network is used in operation 410. However, if better network quality can be provided by an alternate network controller, then the alternate network associated with the alternate network controller is used to provide the network service (see operation 408).

Going back to operation 402, when the type of device is determined to be one that provides multiple transmission support, the user session model is identified, as shown in operation 412. The user model is based on user preference as per a plan selected, so the user model can be a cost model (i.e. for service low cost is more important than quality so in this case the user won't be switched to a better service capable network but instead it will continue to use the current network to save cost). When the user session model is a cost-based model, then the network that is selected for providing the network service is one that optimizes (e.g. minimizes) cost for the user. In the example shown, the currently connected network is used in operation 410.

When the user session model is a quality-based model, then a service requirement for the network service being requested is determined in operation 414. The service requirement can be low latency, high throughput. If the service requirement for the network service is lower than a Performance Service Level (PSL) threshold, then, in the example shown, the currently connected network is used in operation 410. The currently connected network is used as there is no need to switch networks since the service requirement is still not critical and can be fulfilled by the existing network (i.e. so there is no need of a ping pong switch between networks). If the service requirement for the network service is higher than the PSL threshold, then a normal health check of the networks is performed, as shown in operation 416. In particular, since the service requirement can't be fulfilled by the existing network, some network switching or aggregation with another network is required, such that the health checkup of neighboring networks is performed, and results of the health checkup are used as the basis on which existing network has to be switched to, or aggregated with, another network.

In one exemplary use-case, for a network service having a high throughput requirement, a Payload of Data chunk requested by the user may be monitored. If the requested data payload is lower than a certain threshold, then there is no need of utilizing multiple chains (network controllers) as it would lead to extra processing load at requesting device.

As per RFC 7233 (Hypertext Transfer Protocol (HTTP/1.1): Range Requests), Upon receiving Client request, The "Accept-Ranges" header field allows a server to indicate that it supports range requests for the target resource & an origin server that supports byte-range requests for a given target resource may send Accept-Ranges: bytes to indicate what range units are supported.

The "Range" header field on a GET request modifies the method semantics to request transfer of only one or more subranges of the selected representation data at Client end, rather than the entire selected representation data so this functionality could be utilized at the device end.

If the normal health check shows that thresholds are breached, then the currently connected network is used in operation 410. If the normal health check shows that the other networks are better than a configured threshold, then loading based forecasting is performed in operation 418. In other words, load conditions of the other networks are determined and measured against a cell overload threshold. For example, Radio & Load conditions may be measured periodically to decide the ratio of data payload to be downloaded at each radio frequency chain and possibly consider load conditions such that the RAT can be determined to be changed for better throughput.

If the loading based forecasting shows that the cells will be overloaded, then, in the example shown, the currently connected network is used in operation 410. If the loading based forecasting shows that at least one neighboring network has an existing and forecasted load below the threshold, then network controller selection is performed as shown in operation 420. Since multiple transmission support is available, network service is aggregated as per the service requirement, where devices with a higher throughput requirement may be served by different networks aggregated together or a best network as per needs of the device, and similarly a low latency requirement may be served by best technology/network available for that session. In the example shown, two network controllers are selected for the network service. Network service aggregation is then performed, as shown in operation 422.

For a device providing parallel utilization of network controllers, enhancement in grade of services may be provided, such as ultra low latency scenarios, dynamic multiple smart IOT device connectivity, and throughput boost by smart algorithms.

Figure 5:
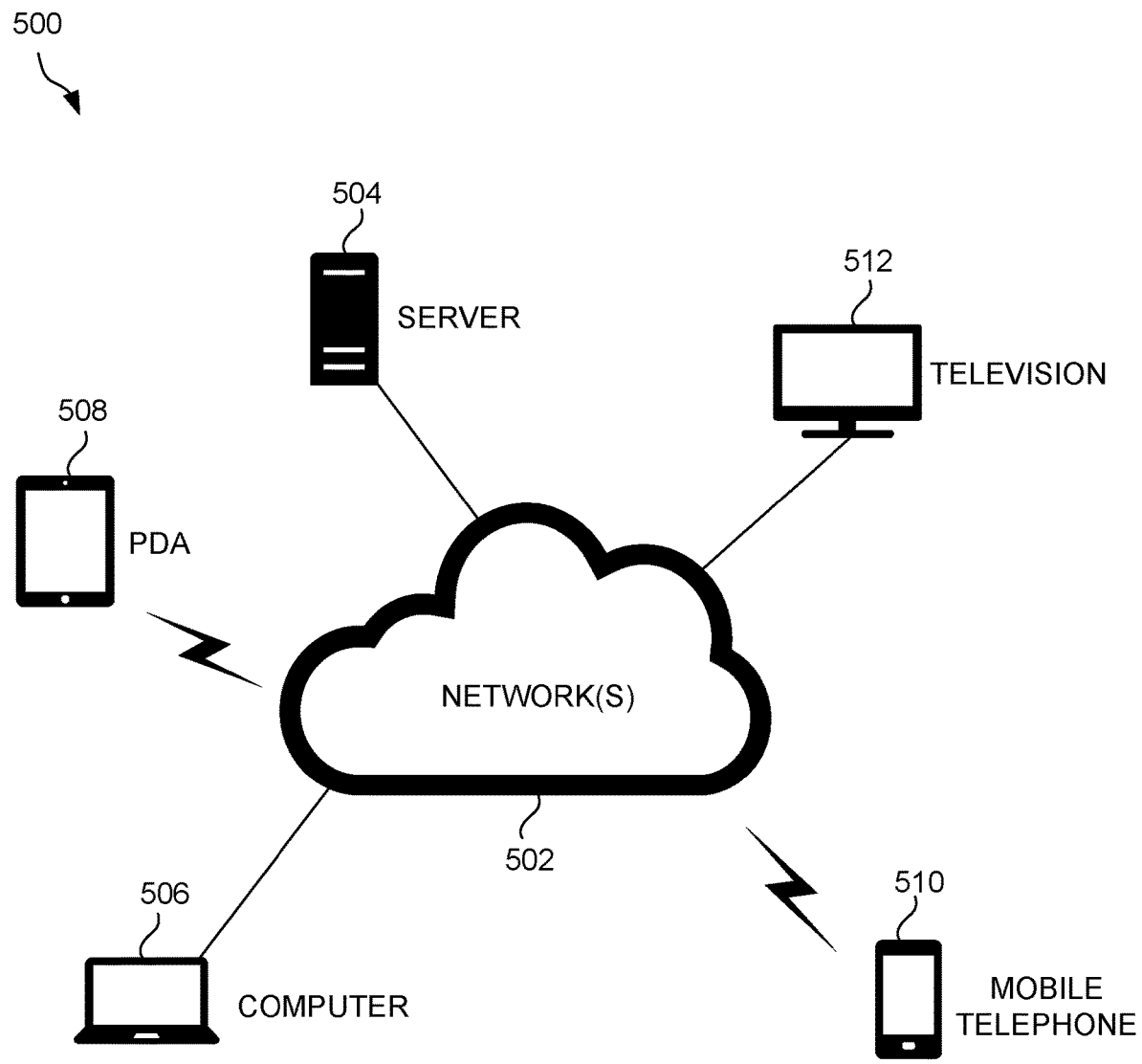
FIG. 5 illustrates a network architecture, in accordance with one possible embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

Figure 6:
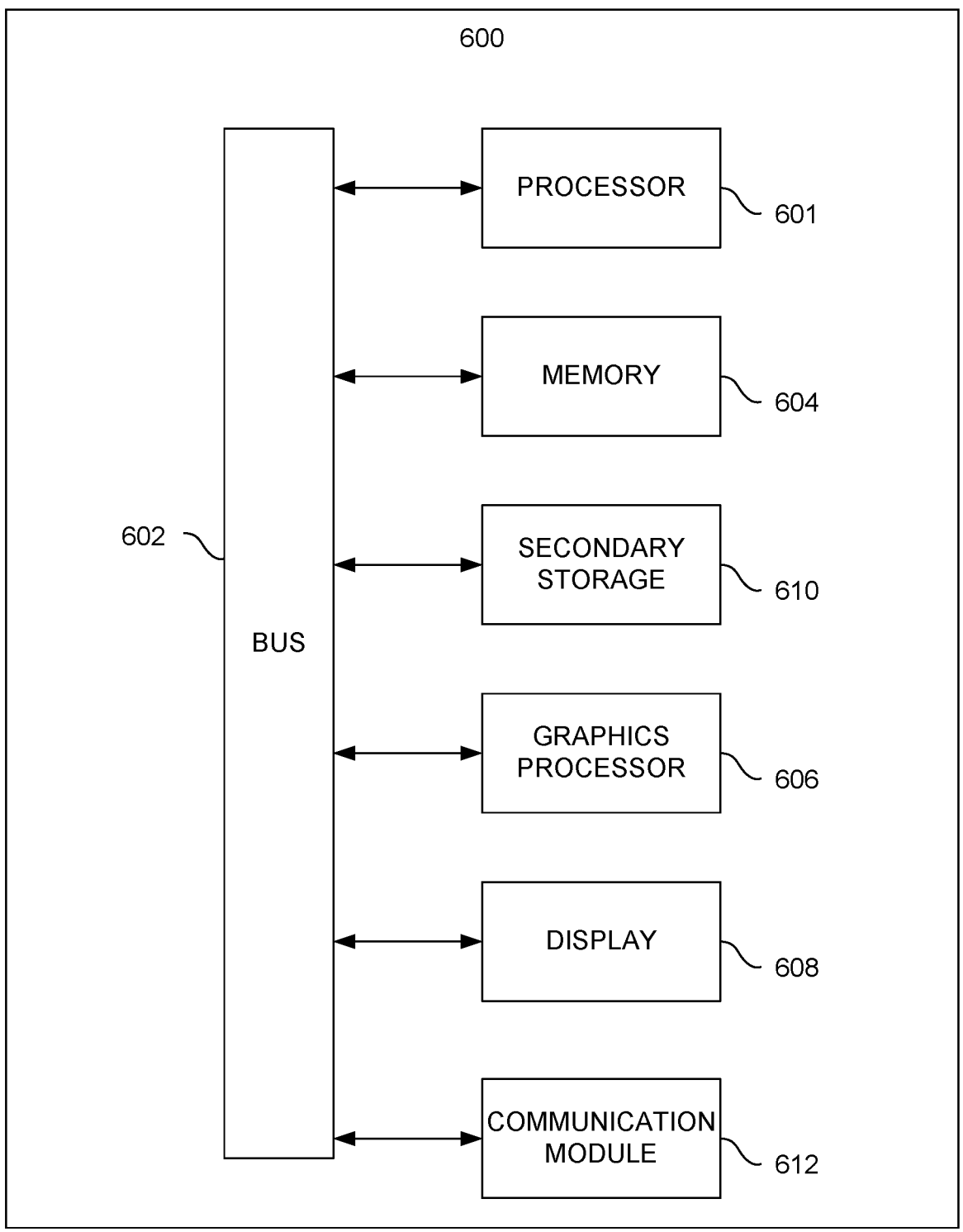
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

The system 600 may also include one or more communication modules 612. The communication module 612 may be operable to facilitate communication between the system 600 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising:
    receiving, by a system having multiple network controllers each associated with a different network of a plurality of networks, a first request for a first network service, the first network service being functionality provided in each network of the plurality of networks;
    in response to receiving the first request:
        identifying, by the system, a first user-specific policy associated with the first request, the first user-specific policy indicating that a quality is to be optimized for the first network service,
        determining, by the system from the first user-specific policy, that the quality is to be optimized for the first network service, responsive to determining that the quality is to be optimized for the first network service, checking, by the system, a current health of each network of the plurality of networks,
        determining, by the system, that the current health of one or more networks of the plurality of networks is better than a configured threshold,
        responsive to determining that the current health of the one or more networks of the plurality of networks is better than a first threshold, forecasting, by the system, load conditions for each network of the one or more networks of the plurality of networks,
        determining, by the system, that the load conditions forecasted for the one or more networks of the plurality of networks is below a second threshold, and
        responsive to determining that the load conditions forecasted for the one or more networks of the plurality of networks is below the second threshold, processing, by the system, the first request to select which networks of the one or more networks of the plurality of networks optimize the quality for the first network service; and
    causing, by the system, network controllers corresponding to the selected networks to provide the first network service.

2. The non-transitory computer readable medium of claim 1, wherein a plurality of the multiple network controllers are associated with a same type of network provided by different service providers.

3. The non-transitory computer readable medium of claim 1, wherein the multiple network controllers include at least one network controller associated with a WiFi network and at least one network controller associated with a cellular network.

4. The non-transitory computer readable medium of claim 1, wherein the system is a master device having the multiple network controllers and further having multiple slave devices.

5. The non-transitory computer readable medium of claim 4, wherein the first request is received from one of the multiple slave devices.

6. The non-transitory computer readable medium of claim 5, wherein the master device causes one or more of the network controllers of the corresponding selected networks to provide the first network service to the one of the multiple slave devices.

7. The non-transitory computer readable medium of claim 4, wherein the master device processes requests for network services from the multiple slave devices and processes the requests to cause selected ones of the network controllers of the corresponding selected networks to provide the network services to the multiple slave devices.

8. The non-transitory computer readable medium of claim 4, wherein the multiple slave devices are internet of things (IoT) devices.

9. The non-transitory computer readable medium of claim 1, wherein the system provides multiple transmission support.

10. The non-transitory computer readable medium of claim 9, wherein the multiple transmission support enables one or more of the network controllers corresponding to the selected networks to provide the first network service while at least one other one of the network controllers is providing another network service.

11. The non-transitory computer readable medium of claim 1, wherein the first network service is an existing network service being consumed by a device of a user, and wherein the first request is initiated automatically by the device for the purpose of improving the quality of the existing network service.

12. The non-transitory computer readable medium of claim 11, wherein the existing network service is consumed through a first network controller of the multiple network controllers, and wherein the network controllers corresponding to the selected network is at least one second network controller of the multiple network controllers such that the device of the user is caused to switch from consuming the existing network service through the first network controller to consuming the existing network service through the at least one second network controller.

13. The non-transitory computer readable medium of claim 1, wherein the first user-specific policy is configured for a current user of a device from which the first request is received.

14. The non-transitory computer readable medium of claim 1, further comprising:
    receiving, by the system, a second request for a second network service, the second network service being functionality provided n each network of the plurality of networks;
    in response to receiving the second request:
        identifying, by the system, a second user-specific policy associated with the second request, the second user-specific policy indicating that a cost is to be optimized for the second network service,
        determining, by the system from the second user-specific policy, that the cost is to be optimized for the second network service, responsive to determining that the cost is to be optimized for the second network service, processing, by the system, the second request to select which additional networks of the plurality of networks optimize the cost for the second network service; and causing network controllers corresponding to the selected additional networks to provide the second network service.

15. The non-transitory computer readable medium of claim 14, wherein optimizing the cost includes minimizing the cost.

16. The non-transitory computer readable medium of claim 15, wherein the additional networks of the plurality of networks that minimize the cost for the second network service are determined based on a plurality of network service subscriptions held by a user associated with the second user-specific policy.

17. A method, comprising:

receiving, by a system having multiple network controllers each associated with a different network of a plurality of networks, a first request for a first network service, the first network service being functionality provided in each network of the plurality of networks;

in response to receiving the first request:
identifying, by the system, a first user-specific policy associated with the first request, the first user-specific policy indicating that a quality is to be optimized for the first network service, determining, by the system from the first user-specific policy, that the quality is to be optimized for the first network service, responsive to determining that the quality is to be optimized for the first network service, checking, by the system, a current health of each network of the plurality of networks, determining, by the system, that the current health of one or more networks of the plurality of networks is better than a configured threshold, responsive to determining that the current health of the one or more networks of the plurality of networks is better than a first threshold, forecasting, by the system, load conditions for each network of the one or more networks of the plurality of networks, determining, by the system, that the load conditions forecasted for the one or more networks of the plurality of networks is below a second threshold, and responsive to determining that the load conditions forecasted for the one or more networks of the plurality of networks is below the second threshold, processing, by the system, the first request to select which networks of the one or more networks of the plurality of networks optimize the quality for the first network service; and causing, by the system, network controllers corresponding to the selected networks to provide the first network service.

18. A system, comprising:

multiple network controllers each associated with a different network of a plurality of networks;

a non-transitory memory storing instructions; and one or more processors in communication with the non-transitory memory that execute the instructions to perform a method comprising:

a first request for a first network service, the first network service being functionality provided in each network of the plurality of networks;

in response to receiving the first request:
identifying, by the system, a first user-specific policy associated with the first request, the first user-specific policy indicating that a quality is to he optimized for the first network service, determining, by the system from the first user-specific policy, that the quality is to he optimized for the first network service, responsive to determining that the quality is to be optimized for the first network service, checking, by the system, a current health of each network of the plurality of networks, determining, by the system, that the current health of one or more networks of the plurality of networks is better than a configured threshold, responsive to determining that the current health of the one or more networks of the plurality of networks is better than a first threshold, forecasting, by the system, load conditions for each network of the one or more networks of the plurality of networks, determining, by the system, that the load conditions forecasted for the one or more networks of the plurality of networks is below a second threshold, and responsive to determining that the load conditions forecasted for the one or more networks of the plurality of networks is below the second threshold, processing, by the system, the first request to select which networks of the one or more networks of the plurality of networks optimize the quality for the first network service; and causing network controllers corresponding to the selected networks to provide the first network service.

* * * * *